Oct. 7, 1969

H. W. BOTELER 3,471,124

DIAPHRAGM VALVE BODY

Original Filed Aug. 19, 1960

INVENTOR
HENRY W. BOTELER
BY
Howard K. Goldberg
ATTORNEY

Oct. 7, 1969

H. W. BOTELER 3,471,124

DIAPHRAGM VALVE BODY

Original Filed Aug. 19, 1960

INVENTOR.
HENRY W. BOTELER
BY
ATTORNEY

INVENTOR.
HENRY W. BOTELER
BY
ATTORNEY

United States Patent Office 3,471,124
Patented Oct. 7, 1969

3,471,124
DIAPHRAGM VALVE BODY
Henry W. Boteler, East Greenwich, R.I., assignor to Grinnel Corporation, Providence, R.I., a corporation of Delaware
Continuation-in-part of application Ser. No. 432,043, Jan. 26, 1965, which is a continuation of application Ser. No. 50,670, Aug. 19, 1960. This application June 12, 1967, Ser. No. 645,225
Int. Cl. F16k 3/02, 25/00, 7/12
U.S. Cl. 251—366        2 Claims

ABSTRACT OF THE DISCLOSURE

A flow passageway portion of a no-weir diaphragm valve body formed without compound curves from a precut flat plate and having a seating area the surface of which is parallel to the axis of the valve and the cross-section of which is a blunted right triangle.

CROSS REFERENCE TO RELATED APPLICATIONS

This application is a continuation-in-part of my prior application Ser. No. 432,043 dated Jan. 26, 1965, now Patent No. 3,374,522, which is in turn a continuation of my prior application Ser. No. 50,670 dated Aug. 19, 1960, now abandoned.

BACKGROUND OF THE INVENTION

The field of this invention relates to bodies for no-weir diaphragm valves of the type wherein closure is accomplished by linear motion of an actuator which drives a deep, blunted, cone shaped diaphragm of relatively thin, deformable material, secured at its periphery to the valve body into sealing relation with a seating area on the interior surface of the body. In particular it is concerned with flow passage portion of no-weir diaphragm valve bodies formed without compound curves from a single pre-cut flat plate wherein the surface of the seating area throughout its length is parallel to the axis of the flow passage and wherein a straight line may be drawn on the surface of the flow passageway from every point on the edge of any one of its openings to a point on the endge of one of the other openings.

Basically, past practice has generally taken the approach of casting such valve bodies as described in U.S. Patent Re. 24,350 to R. H. Price et al.

SUMMARY OF THE INVENTION

The no-weir diaphragm valve body of the instant invention is essentially a conduit providing a flow passageway between a pair of parallel, axially aligned circular end openings having another opening on one side thereof which is larger than the end openings, is in a plane parallel to the axis of alignment of the end openings and is spaced from that axis a distance equal to at least the major portion of the radius of the end openings. This conduit also has a seating area opposite the side opening which is on or immediately adjacent the wall of the flow passageway and which extends all of the way around the inside of the flow passageway from one point on the opening to another point on the opening opposite the first point. This seating area when viewed in cross-section has linear wall surfaces converging from the side opening which merge tangentially at the bottom of the seat with a curved surface having generally the same radius as the end openings. In the completed valve a deep, blunted cone shaped flexible diaphragm having generally the same cross-sectional shape as the seating area, is clamped to a clamping plate which is welded to the body adjacent the edge of the side opening. The diaphragm provides the valve with a flexible wall segment which covers the side opening. To open the valve the diaphragm is drawn back through the side opening substantially out of the flow passageway. To close the valve the diaphragm is pressed through the side opening against the seating area, the converging sides and arcuate bottom of which accommodate the deep cone shaped diaphragm.

When a valve body as described above is made by straight line bending techniques a very advantageous seating geometry is automatically provided. To appreciate this advantage the valve body of the instant invention may be compared with the cast no-weir valve bodies now in use. The cast valve has generally the same relationship between the side and end openings, however, the conduit comprises a cylindrical passageway between the end openings intersected in the middle by a hollow cone shaped section leading from the side opening and having the same shape as the diaphragm. Thus, the surface of the portion of the seating area at the bottom which is on the wall of the cylinder is parallel to he axis of the end openings and thus the footprint of the spherical portion of the bottom of the diaphragm on the cylindrical surface of the bottom of the seat is a narrow strip providing a high sealing pressure. On the sides of the seating area of the conventional cast no-weir valve, however, which have the same radius of curvature as the diaphragm, when viewed in cross-section parallel to the side opening, the seating area is co-extensive with the conical sides of the diaphragm. Thus the seating force is distributed over a wider area and the seating pressure is thereby lower than at the bottom of the seat.

Even in cases where the radius of curvature of the sides of the seat is slightly larger than that of the diaphragm the curved sides of the seat produce a broader footprint of the diaphragm against the sides of the seat and then at the bottom consequently lower footprint pressure at the sides of the seat than at the bottom. This is further aggrevated by the unavoidable fact that the component of force normal to the seat is lower against the sides of the seat than at the bottom. Thus the line pressure against which the valve is able to produce complete closure is governed by the point of lowest footprint pressure. With the valve of the instant invention the bottom of the conduit is also longitudinally cylindrical and thus has a surface parallel to the axis of the end openings. The sides of the seating area, however, fall on flat triangular areas rather than conical areas as is the case with conventional cast no-weir valves. These triangular areas extend laterally from their apexes at opposite sides of the side opening to their bases at the point of tangency of the triangular areas with the rounded bottom. The base of the triangle extends longitudinally from one end opening to the other. Thus the sides of the seating area are also longitudinally flat and thus parallel with the axis of the end openings. Since both the sides and bottom of the seating area are longitudinally flat and thus parallel to the axis of the end openings the seating area is flat for its entire length.

As previously stated the footprint pressure is lowest on the sides of the seat due to smaller normal forces against the sloping sides of the seat. Thus it is particularly desirable to have the sides as well as the bottom of the seating region parallel to the axis of alignment of the end openings to have the footprint pressure on the sides as high as possible.

Theoretically, the contact between the flat seat and the blunted conical diaphragm, which is a body of revolution, is along a line. In practice, however, since the diaphragm is elastomeric and thus subject to compression the contact between the seat and the diaphragm or the footprint of the diaphragm against the seat is a narrow strip extending along the exterior surface of the flow passageway from one side of the side opening to the opposite side of the side opening. Since the valve body as originally formed provides triangular converging sides the triangle must be truncated sufficiently to remove the point at its apex so that a flat seating region of substantial width is provided throughout. For this reason the original side opening is relieved sufficiently to truncate the triangular sides to the degree necessary.

In certain types of service where sanitary requirements are high or where certain chemicals are involved it is necessary to provide diaphragm valves of stainless steel having a highly polished interior surface or having a fused glass lining.

Where a highly polished stainless steel valve is required difficulties are encountered with cast bodies due to the high porosity of cast stainless steel. When there is porosity on the interior surface of the body extensive grinding must be done with subsequent undesirable changes in contour. In lieu of grinding, the depositing of weld metal in surface voids is often necessary. Both of these procedures are very costly. The problem is further complicated by voids just under the surface of the metal. These may be exposed by the grinding of surface irregularities and may therefore require further extensive grinding or welding. The procedures involved in correcting the porosity and void problems often add considerably to the cost of the cast body.

Where a valve having a fused glass lining is required porosity cannot be tolerated and very careful pre-treatment of the valve interior is required. Voids, as well as the composition of the metal, cause gas to be given off under the lining which causes cracking and separation of the fused lining. Another difficulty arises during the fusing process. The heat involved in the fusing process materially weakens the metal of the casting. For this reason fusing temperatures must be limited. However, limiting the fusing temperatures limits the types of lining material which may be used. Thus, the lining material which may be used with grey iron casting can withstand a thermal differential in service of only about 100° F. while a lining which may be used with ductile iron can withstand only a 180° F. differential. It must be further noted that both cast ductile iron and cast steel, either carbon or stainless, present very difficult gas problems which cause a high reject rate. On the other hand, the lining materials which may be used with very low carbon cold rolled steel plate, can withstand considerable higher fusing temperatures and the very low carbon cold rolled steel plate presents little or no gas problems. Thus, the lining material which may be fused to this material can withstand a thermal differential in service of over 250° F.

The instant invention provides a valve body which can be fabricated from either cold rolled very low carbon steel plate or stainless steel plate. When low carbon steel is used the valve body may be lined with superior materials. When either very low carbon cold rolled steel plate or stainless steel plate is used the fabricated valve body requires far less surface preparation prior to fusing due to its inherently void free surfaces and minimal porosity.

In summary, the valve body of this invention provides a body having a very desirable seating configuration as well as a smooth interior surface in the "as fabricated" form which in stainless steel may be used with very little interior surface preparation or which when fabricated from very low carbon cold rolled steel plate may be lined with fused glass or ceramic materials which are considerably tougher than those which may be used with cast bodies. The reject rate experienced in production of these bodies is thus materially reduced as a result of the inherent freedom from gas, porosity, and voids which is the nature of cold rolled stainless steel or cold rolled very low carbon steel plate. Also since there is less preparation required, where rejects do occur, the work cost prior to rejection of the rejected piece is far less. Still further, the fabrication techniques involved are simple and require a far smaller fixed investment then required for cast or molded bodies.

Accordingly, one object of my invention is to provide an improved diaphragm valve wherein the body is fabricated from a plurality of parts joined together but wherein at least one of these parts has been formed in such a way from flat stock that only a small number of parts are required to obtain the desired body shape.

Another object is to provide an improved diaphragm valve wherein the body is fabricated from a plurality of parts joined together, but wherein at least one of these parts has been wrapped in such a way from flat stock that from any point on the edge of one of its openings a straight line can be drawn in the surface thereof to a point on the edge of another remote opening.

Another object is to provide an improved diaphragm valve wherein the body is made up by joining together a number of parts which is a small number because one of these parts have been formed by wrapping a piece of flat stock into novel shapes.

Another object of the instant invention is to provide an improved no-weir diaphragm valve wherein at least a portion of the body is formed from a single piece of flat stock by wrapping to provide an improved seating area.

Another object of the instant invention is to provide an improved no-weir diaphragm valve wherein the body portion of the valve is formed from a single piece of pre-cut flat stock by wrapping wherein the end openings of the valve are circular, parallel and axially aligned and wherein the side opening of the valve is larger than the end openings, is in a plane parallel to the axis of alignment of the end openings and is spaced from that axis a distance equal to at least the major portion of the radius of the end openings to provide an easily fabricated valve having a seating area which is longitudinally flat throughout its entire length.

Another object of the instant invention is to provide an improved no-weir diaphragm valve wherein the body portion of the valve is formed from a single piece of pre-cut flat stock by wrapping wherein the end openings of the valve are circular, parallel and axially aligned and wherein the surface of the seating area of the valve body portion is parallel to the axis of alignment of the end openings.

Another object of the instant invention is the provision of a no-weir valve which may be fabricated from materials not hitherto well suited to the production of no-weir valves to provide valves with better interior surface characteristics.

Another object of the instnt invention is the provision of a no-weir valve which may be fabricated from materials which enable the lining of the valves with glass and ceramics requiring fusing temperatures too high for cast valves to provide lined valves able to withstand greater thermal shock than is tolerated by linings which may be used on cast valves.

Figure 1:
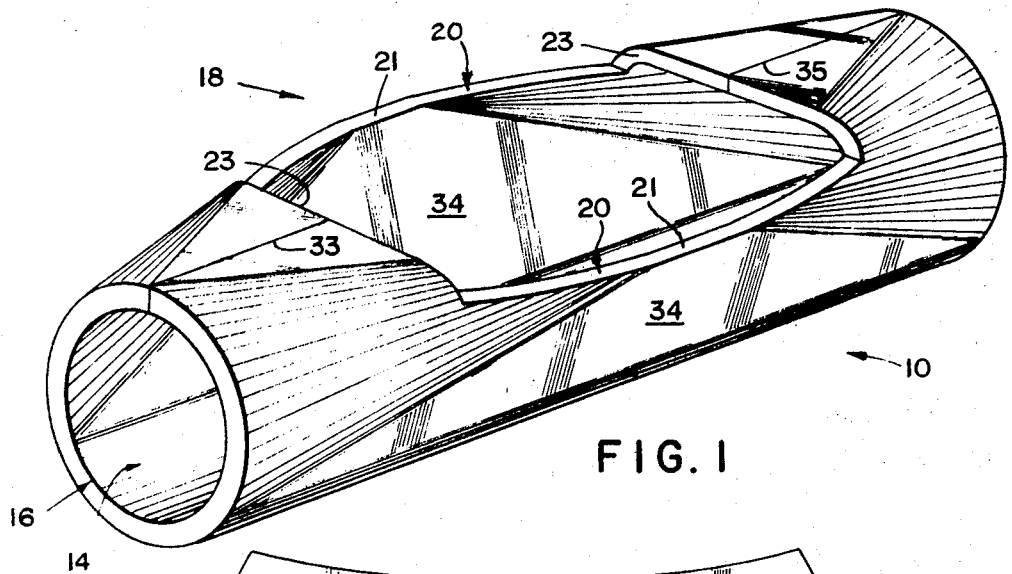
FIGURE 1 is a isometric view of the flow passage portion of the diaphragm valve body embodying the improvements of the present invention.
Figure 2:
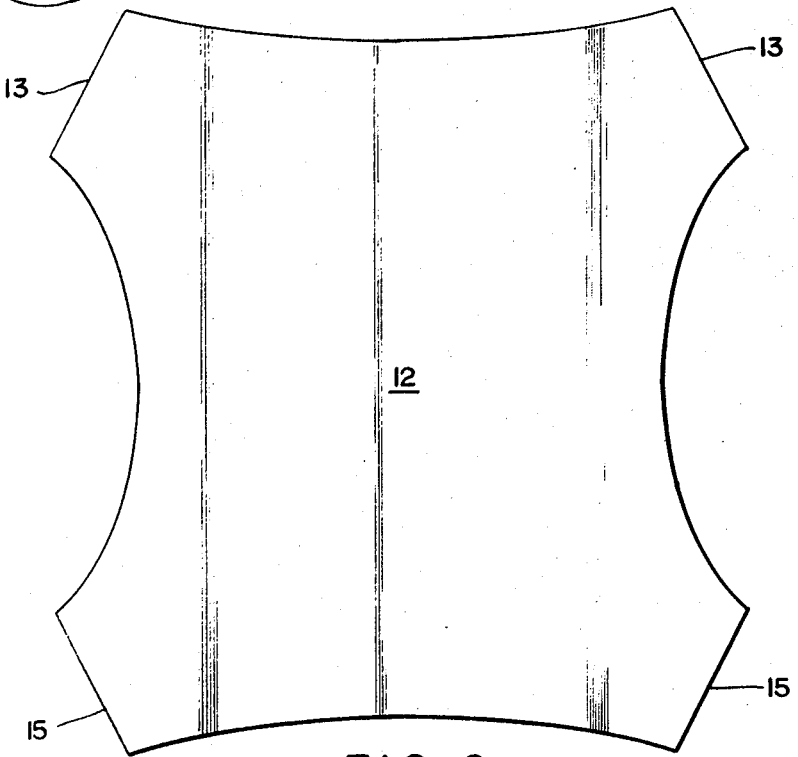
FIGURE 2 is a plan view of the plate from which the embodiment of FIG. 1 is formed.

FIG. 1 shows an embodiment of the instant invention. Valve body 10 is the body of a no-wier valve the wall of which is formed by simple straight line wrapping techniques from a pre-cut plate 12 (FIG. 2). The interior surface 14 of the valve body defines a flow passageway between the circular, axially aligned end openings 16. A side opening 18 is provided in the body centrally located between the end openings. This side opening lies in an imaginary plane A (FIG. 5) which is parallel to the axis B of the end openings and is spaced from the axis a distance at least equal to the major portion of the radius of the end openings. Bordering the side opening are a pair of mirror image longitudinal sides 20 lying in plane A and having a width at least equal to the thickness of the body wall. The distance between sides 20 at their midpoint is at least greater than the diameter of the end openings. This side opening is adapted to receive a clamping plate 22 (FIG. 4) which rests upon the longitudinal sides and is attached by weld 24 to the valve body.

Figure 5:
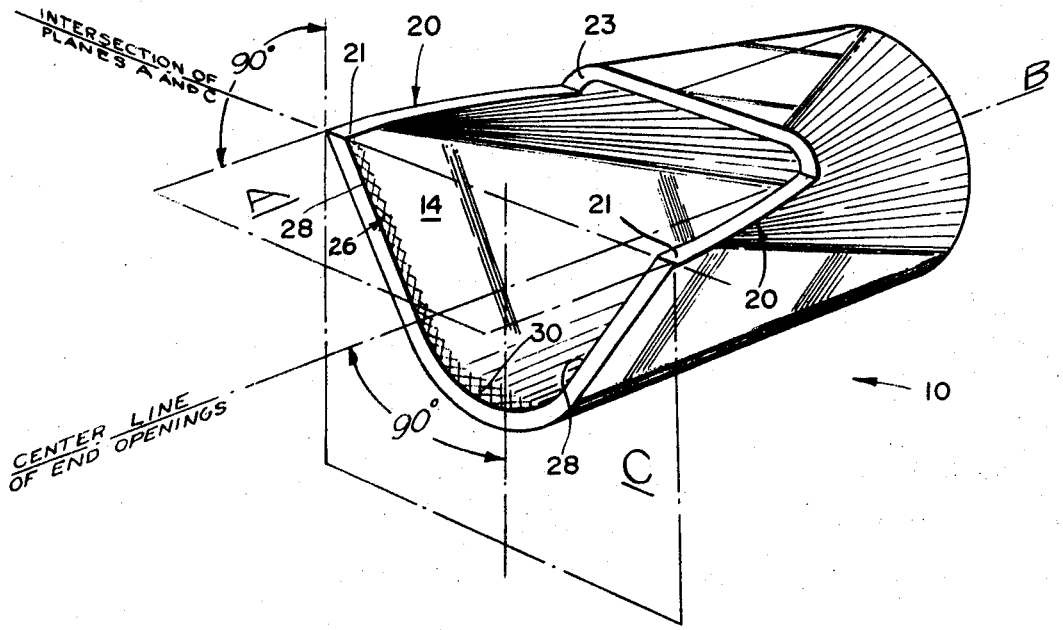
FIGURE 5 is an isometric cutaway of the embodiment of FIGURE 1 illustrating some imaginary planes which are used to describe the instant invention.
Figure 6:
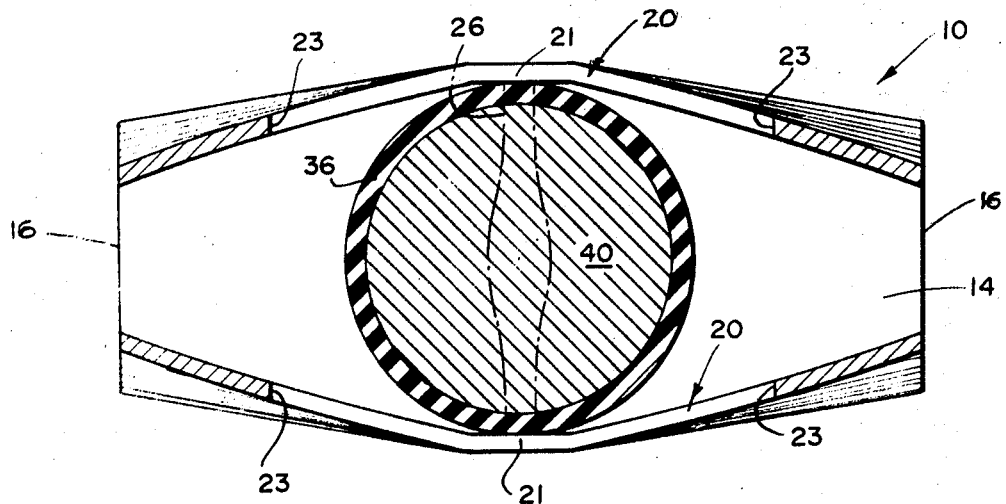
FIGURE 6 is a sectional view of the embodiment of FIGURE 1 taken at the plane indicated in 4.

As a result of forming the valve body by straight line bending or wrapping between the end openings and the side opening which are spacially related as described above, a region 26 half of which is shown cross hatched in FIG. 5 adjacent the intersection of plane C and the interior surface 14 of the valve body is provided having unique characteristics as a no-weir diaphragm valve seat. Plane C (FIG. 5) is a plane located at the midpoint of the longitudinal sides 20 which is perpendicular to both plane A and axis B. Region 26 when viewed in cross-section at the intersection of plane C and the interior surface of the body comprises a pair of straight sides 28 converging from side 20 and an arcuate bottom portion 30 tangentially connecting the sides 20 at the bottom of the seating area and having the same radius of curvature as the end openings. Longitudinally this region has an infinite radius of curvature and is therefore parallel to axis B and longitudinally flat.

Figure 3:
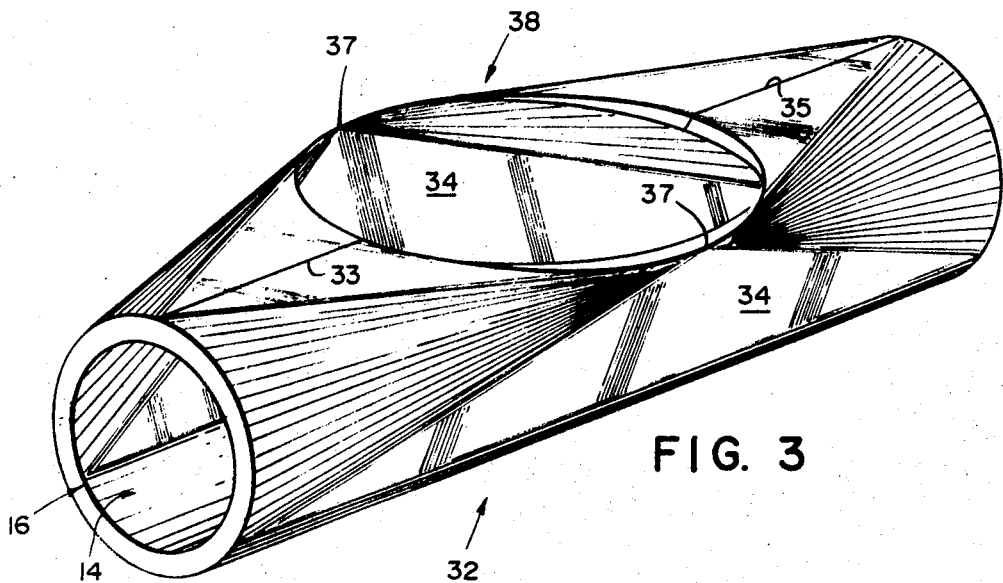
FIGURE 3 is an isometric view of the blank from which the embodiment of FIGURE 1 is formed.

Blank 32 (FIG. 3) is formed by wrapping plate 12. Pre-cut edges 13 and 15 are joined by welds 33 and 35 respectively to form the flow passageway. It will be noticed that planar triangular areas 34 are formed on the sides of the blank which merge tangentially with the cylindrical bottom of the valve. These triangular areas have their apex 37 at the intersection of the periphery of the side opening and the lateral diameter thereof. The triangular areas provide the flat linear converging sides of the seating areas. In practice, because of the elastomeric nature of the diaphragm 36, the seating area must have a definite width. Since this is to be provided over the entire length of the seating area the triangle must be truncated by removal of the apex leaving portions 21 of sides 20 which are parallel to the axis of the end openings. To this end the original opening 38 in the blank is relieved as shown in FIG. 1 to provide the final side opening 18. The relief is extended longitudinally to the extent necessary to receive the clamping plate 22 between the lateral sides 23 of the side opening. The relief of the side opening further provides a flat surface on sides 20 in plane A upon which the clamping plate rests. Weld 24 joints the plate 22 to sides 20 and 23.

Figure 4:
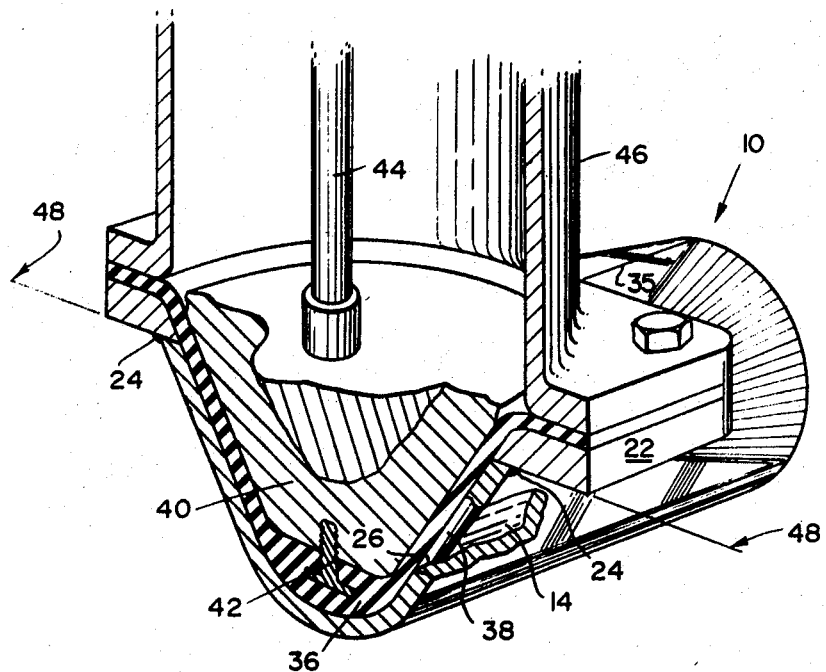
FIGURE 4 is an isometric cutaway view of the valve in which the embodiment of the instant invention is used.

FIG. 4 further illustrates the relationship of the diaphragm 36 and the seating area and shows the flattened portion 38 of the diaphragm which impinges upon the seat. The valve in its finished assembled form is further provided with a valve depresser 40 connected to the diaphragm by stud 42 and an actuator 44 and bonnet 46 partially shown in FIG. 3.

FIG. 5 is a sectional view of the invention with the section taken along line 48 of FIG. 4, diaphragm 36 and its relationship to the seating area 26 (shown in broken lines) as well as the relationship of the diaphragm to the sides of the valve. Note that the footprint of the diaphragm against the seat is substantially narrower than side portion 21. Since this is the narrowest portion of the triangular sides 34 it can be seen that the footprint of the diaphragm against the seat is entirely on that portion of the interior surface of the body which is parallel to the axis of the end openings and therefore flat. From this it can be seen that a higher pressure seal between the diaphragm and the seat is obtained with the valve of the instant invention than is obtained with the conventional cast no-wire valve with the application of equal depresser force in each case.

Example

One example of this embodiment of the instant invention wherein the side of the blank having the side opening is flat is a 2 inch valve having the following dimensions:

|  | Inches |
|---|---|
| Length | 6¼ |
| Diameter of end openings | 2 |
| Distance of plane A from axis of alignment | ¾ |
| Width of side opening at widest point | 3 |

From these dimensions it can be seen that by relieving side opening ¼″ the side triangular areas have been truncated sufficiently to provide a seating width at the plane of the relieved side opening of approximately 1 inch which is substantially more than the expected footprint width at this point of approximately ¼ inch thus insuring that the footprint of the diaphragm against the seating region will only fall on that portion of the interior surface which is parallel to the axis of alignment of the end openings.

I claim:
1. A diaphragm valve body comprising:
 (I) An interior surface
 (II) A pair of end openings which:
  (A) are defined by said interior surface
  (B) are circular
  (C) have an axis of alignment
 (III) a side opening in said body which:
  (A) is:
   (1) defined by said interior surface
   (2) larger than said end openings
   (3) spaced from said axis a distance at least as great as the major portion of the radius of the end openings
  (B) lies:
   (1) between said end openings
   (2) in a first plane which is parallel to said axis
 (IV) A seating region which is adjacent the intersection of:
  (A) said interior surface and
  (B) a second plane which is:
   (1) normal to;
    (a) said first plane
    (b) said axis
   (2) generally centrally located with respect to said side opening
 (V) said interior surface being such that a straight line may be drawn on said interior surface from any point on one of said openings to a point on at least one of said other openings,
whereby said seating region is parallel to said axis, has a cross-sectional shape at least a portion of which, adjacent to said side opening, has straight sides convergant from said side opening, and whereby said straight sides are connected by an arcuate portion having the same radius as said end openings, wherein said body is formed from a flat metal plate having a generally uniform thickness and has a wall defined by said interior surface and an exterior surface generally uniformly spaced from said interior surface, wherein said side opening has a pair of laterally extending sides and has a pair of longitudinally extending mirror image sides equally recessed from said laterally extending sides, and wherein said longitudinally extending sides are coplanar and define said first plane.

2. A valve body according to claim 1 wherein said longitudinally extending sides are recessed from said laterally extending sides a sufficient distance to provide said seating region with a substantial width throughout.

References Cited

UNITED STATES PATENTS

| Re. 24,350 | 8/1957 | Price et al. | 251—331 X |
|---|---|---|---|
| 685,438 | 10/1901 | Warburton | 251—366 X |
| 1,699,541 | 1/1929 | Murray | 251—366 |
| 2,369,025 | 2/1945 | Cummings | 251—368 X |

ARNOLD ROSENTHAL, Primary Examiner

U.S. Cl. X.R.

29—157.1; 251—331